United States Patent
Hirano et al.

(10) Patent No.: US 10,421,255 B2
(45) Date of Patent: Sep. 24, 2019

(54) INTERLAYER FILM FOR LAMINATED GLASS, AND LAMINATED GLASS

(71) Applicant: SEKISUI CHEMICAL CO., LTD., Osaka, Osaka (JP)

(72) Inventors: Hiroyuki Hirano, Kouka (JP); Yuji Uchimura, Kouka (JP); Shougo Yoshida, Kouka (JP); Akira Mizumori, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/515,549

(22) PCT Filed: Sep. 30, 2015

(86) PCT No.: PCT/JP2015/077864
§ 371 (c)(1),
(2) Date: Mar. 29, 2017

(87) PCT Pub. No.: WO2016/052672
PCT Pub. Date: Apr. 7, 2016

(65) Prior Publication Data
US 2017/0225435 A1     Aug. 10, 2017

(30) Foreign Application Priority Data
Sep. 30, 2014   (JP) ................................. 2014-202618

(51) Int. Cl.
*B32B 17/10*   (2006.01)
*C08K 3/08*    (2006.01)

(52) U.S. Cl.
CPC .. *B32B 17/10688* (2013.01); *B32B 17/10761* (2013.01); *B32B 2250/03* (2013.01); *B32B 2605/006* (2013.01)

(58) Field of Classification Search
CPC ... B32B 17/10605; B32B 27/18; B32B 27/30; B32B 17/10761
(Continued)

(56) References Cited

U.S. PATENT DOCUMENTS

2001/0046595 A1* 11/2001 Moran ................... C09J 7/0239
428/212
2005/0170160 A1   8/2005 Moran et al.
(Continued)

FOREIGN PATENT DOCUMENTS

CN      102060450 A    5/2011
CN      103282323 A    9/2013
(Continued)

OTHER PUBLICATIONS

Written Opinion of the International Seat ping Authority (PCT/ISA/237) for Application No. PCT/JP2015/077864 dated Dec. 22, 2015 (English Translation dated Apr. 13, 2017).
(Continued)

*Primary Examiner* — Tahseen Khan
(74) *Attorney, Agent, or Firm* — Cheng Law Group, PLLC

(57) ABSTRACT

There is provided an interlayer film for laminated glass with which the HIC can be effectively lowered. The interlayer film for laminated glass according to the present invention includes a thermoplastic resin and a plasticizer, and when the interlayer film is sandwiched between two sheets of clear glass in accordance with JIS R3202 to obtain a sheet of laminated glass, the flexural modulus at 23° C. of the resulting sheet of laminated glass is 5000 MPa or more and 10000 MPa or less.

18 Claims, 3 Drawing Sheets

(58) Field of Classification Search
USPC .......................................................... 428/213
See application file for complete search history.

(56) References Cited

U.S. PATENT DOCUMENTS

| | | | |
|---|---|---|---|
| 2006/0008658 | A1 | 1/2006 | Fukatani et al. |
| 2008/0280116 | A1 | 11/2008 | Fukatani et al. |
| 2010/0209716 | A1 | 8/2010 | Fukatani et al. |
| 2010/0279150 | A1 | 11/2010 | Hatta et al. |
| 2013/0074931 | A1* | 3/2013 | Chen .................. C08K 5/1515 136/259 |
| 2013/0224456 | A1 | 8/2013 | Moran et al. |
| 2013/0273379 | A1* | 10/2013 | Iwamoto ........... B32B 17/10605 428/437 |
| 2015/0251385 | A1 | 9/2015 | Oota et al. |
| 2015/0258752 | A1 | 9/2015 | Oota et al. |
| 2016/0311199 | A1 | 10/2016 | Iwamoto et al. |

FOREIGN PATENT DOCUMENTS

| | | | |
|---|---|---|---|
| CN | 105658595 | A | 6/2016 |
| EP | 2 522 691 | A2 | 11/2012 |
| EP | 3 095 767 | A1 | 11/2016 |
| JP | 2001-206742 | A | 7/2001 |
| JP | 2003-516921 | A | 5/2003 |
| JP | 2005-112694 | A | 4/2005 |
| WO | WO-2005/018969 | A1 | 3/2005 |
| WO | WO-2009/093655 | A1 | 7/2009 |
| WO | WO-2012/091116 | A1 | 7/2012 |
| WO | WO2012091117 | A1 * | 7/2012 |
| WO | WO-2014/051140 | A1 | 4/2014 |
| WO | WO-2015/108119 | A1 | 7/2015 |

OTHER PUBLICATIONS

International Search Report for the Application No. PCT/JP2015/077864 dated Dec. 22, 2015.
Written Opinion of the International Searching Authority (PCT/ISA/237) for Application No. PCT/JP2015/077864 dated Dec. 22, 2015.
Supplementary European Search Report for the Application No. EP 15 848 021.0 dated Mar. 20, 2018.
The First Office Action for the Application No. 201580048489.2 from the State Intellectual Property Office of the People's Republic of China dated Feb. 14, 2019.
Notification of Reasons for Refusal for the Application No. 2015-553948 from Japan Patent Office dated Jul. 30, 2019.

* cited by examiner

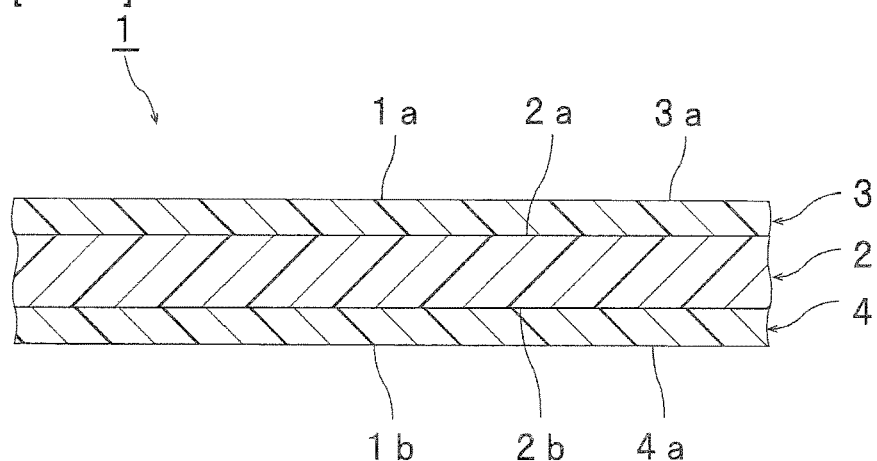
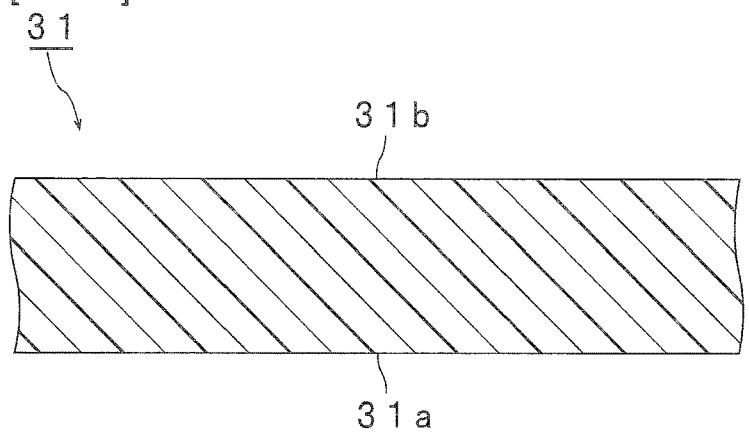
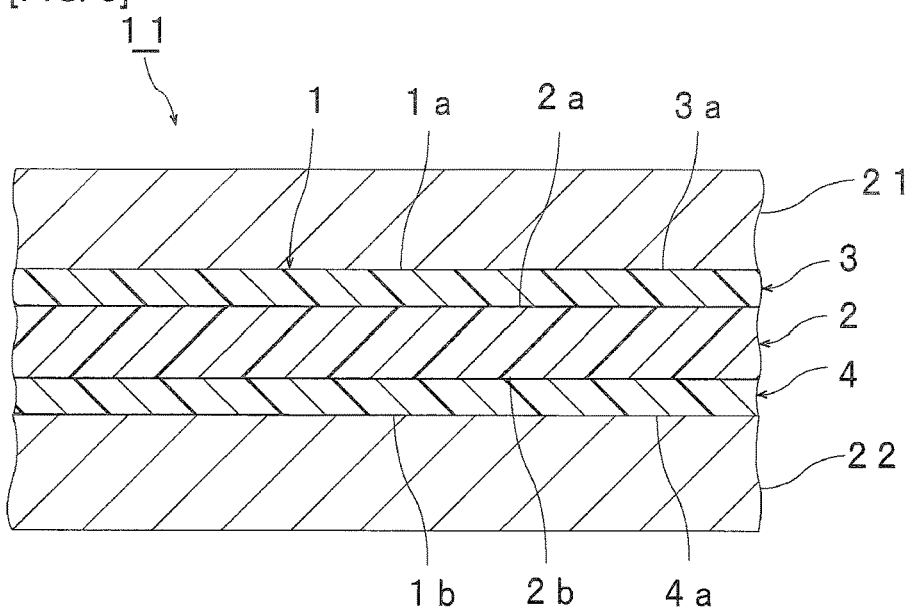

[FIG. 4]
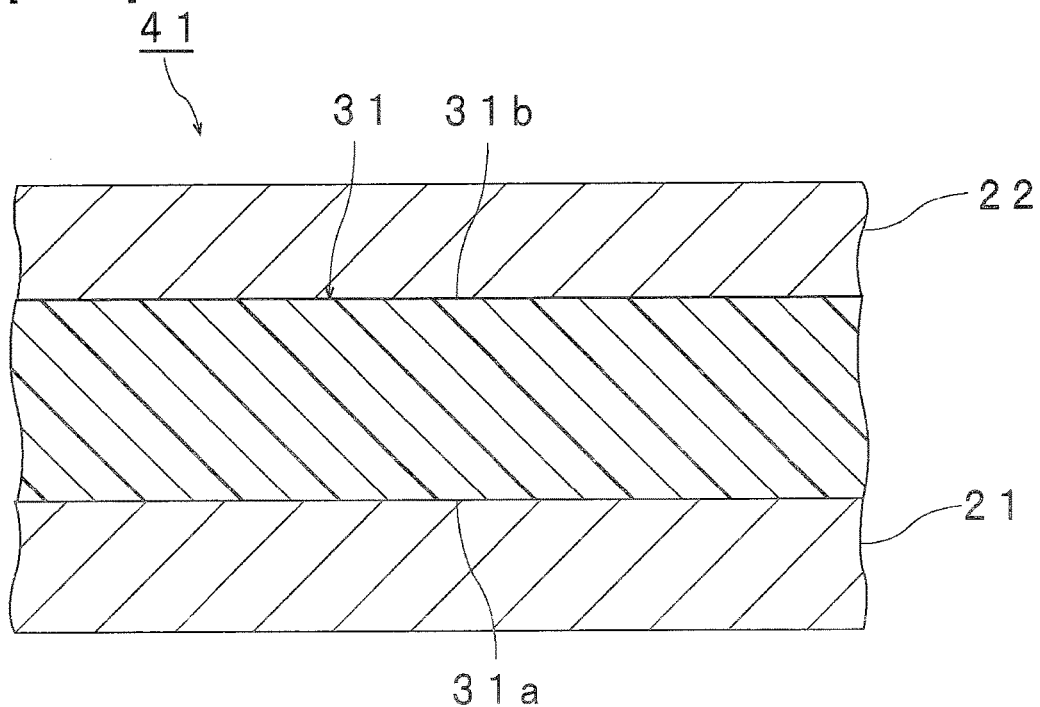
[FIG. 5]
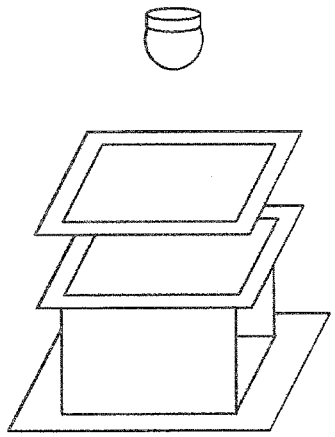

[FIG. 6]
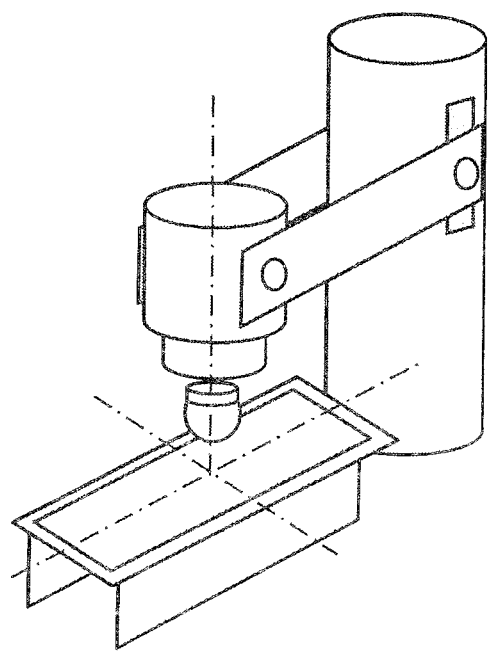

INTERLAYER FILM FOR LAMINATED GLASS, AND LAMINATED GLASS

TECHNICAL FIELD

The present invention relates to an interlayer film for laminated glass used to obtain laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

When laminated glass is used as a windshield of a vehicle such as an automobile, the head of an occupant of the vehicle sometimes collides with the windshield when the vehicle is involved in an accident or the like. When the head of an occupant collides with the windshield, the occupant penetrates through the windshield and sometimes jumps out to the outside of the vehicle. For the purpose of protecting the safety of an occupant, it is preferred that the occupant be prevented from penetrating through the windshield even if the head of the occupant collides with the windshield.

Moreover, the regal regulation on head protection for a pedestrian has been started in various countries, the head protection has been reinforced and the regulation on leg protection has been supplementarily added. At the time of a collision between a vehicle and a pedestrian, as a portion by which a fatal wound is inflicted on the pedestrian, the head is the most frequent portion. In Japan, a testing method for digitizing the injury to a head is prescribed. While assuming a collision of the head of a pedestrian with a windshield or the like, a dummy made in imitation of the adult human head (a headform impactor) is shot from a testing machine against an object and the impact received by the headform impactor is measured to be evaluated as the head injury criteria (HIC).

There have hitherto been many windshields with an HIC of greater than 1000. On the other hand, in recent years, it has been announced that there are windshields with an HIC of 1000 or less. Moreover, in recent years, a vehicle mounted with an air bag for pedestrian protection has been developed, and the HIC is remarkably lowered.

For example, the following Patent Document 1 discloses laminated glass with an HIC of 1000 or less. Moreover, the following Patent Document 2 discloses laminated glass with which, at the time of a collision with a collision object, the reaction force received by the collision object from the glass can be reduced.

RELATED ART DOCUMENT

Patent Document

Patent Document 1: WO 2005/018969 A1
Patent Document 2: JP 2005-112694 A

SUMMARY OF THE INVENTION

Problems to be Solved by the Invention

However, it cannot be said that the numerical value of the HIC is sufficiently lowered. As such, at the time of a collision of a vehicle against a pedestrian, it is thought that there is still a high possibility of inflicting an injury on the pedestrian.

Moreover, although laminated glass with an HIC of 1000 or less is disclosed in Patent Document 1, due to diversification of interlayer films, a technique for adopting a configuration differing from the configuration described in Patent Document 1 and making the HIC of laminated glass low has been desired.

In Patent Document 2, a first glass plate arranged on the outside of the automobile interior, a second glass plate and an interlayer film arranged between the first glass plate and the second glass plate are bonded to one another to constitute a sheet of laminated glass. The reaction force received by a headform impactor when the headform impactor is brought into collision with the sheet of laminated glass is shown. In the case of laminated glass, when the headform impactor is brought into collision with a sheet of windshield glass, depending on the waveform of the reaction force, a primary peak load is generated by the influence of the glass plate, and then, a secondary peak load by the influence of the interlayer film is generated. It is difficult to lower the primary peak load, but it is possible to lower the secondary peak load. Thus, in Patent Document 2, the specific characteristics of the interlayer film are set so that the secondary peak is lowered.

However, in a sheet of laminated glass prepared with an interlayer film in which the specific characteristics thereof are set as described in Patent Document 2, there are cases where the HIC is not effectively lowered.

An object of the present invention is to provide an interlayer film for laminated glass with which the HIC can be effectively lowered. Moreover, the present invention is also aimed at providing laminated glass prepared with the above-mentioned interlayer film for laminated glass.

Means for Solving the Problems

According to a broad aspect of the present invention, there is provided an interlayer film for laminated glass including a thermoplastic resin and a plasticizer, when the interlayer film is sandwiched between two sheets of clear glass in accordance with JIS R3202 to obtain a sheet of laminated glass, the flexural modulus at 23° C. of the resulting sheet of laminated glass being 5000 MPa or more and 10000 MPa or less.

In a specific aspect of the interlayer film for laminated glass according to the present invention, the interlayer film is provided with a first layer containing a thermoplastic resin and a plasticizer, a second layer containing a thermoplastic resin and a plasticizer and a third layer containing a thermoplastic resin and a plasticizer, the second layer is layered on one surface side of the first layer, and the third layer is layered on a surface side opposite to the one surface side of the first layer.

In a specific aspect of the interlayer film for laminated glass according to the present invention, the glass transition temperature of the first layer is lower than the glass transition temperature of each of the second layer and the third layer, the thickness of the first layer is thinner than the thickness of each of the second layer and the third layer, and the thickness of the first layer is 180 μm or more or the ratio of the thickness of the first layer to the total thickness of the first layer, the second layer and the third layer is greater than 0.15.

According to a broad aspect of the present invention, there is provided an interlayer film for laminated glass including a first layer containing a thermoplastic resin and a plasticizer, a second layer containing a thermoplastic resin and a plasticizer and a third layer containing a thermoplastic resin and a plasticizer, the second layer being layered on one surface side of the first layer, the third layer being layered on a surface side opposite to the one surface side of the first layer, the glass transition temperature of the first layer being lower than the glass transition temperature of each of the second layer and the third layer, the thickness of the first layer being thinner than the thickness of each of the second layer and the third layer, and the thickness of the first layer being 180 µm or more or the ratio of the thickness of the first layer to the total thickness of the first layer, the second layer and the third layer being greater than 0.15.

In a specific aspect of the interlayer film for laminated glass according to the present invention, each of the thermoplastic resin in the first layer, the thermoplastic resin in the second layer and the thermoplastic resin in the third layer is a polyvinyl acetal resin.

In a specific aspect of the interlayer film for laminated glass according to the present invention, the content of the hydroxyl group of the polyvinyl acetal resin in the first layer is lower than the content of the hydroxyl group of each of the polyvinyl acetal resin in the second layer and the polyvinyl acetal resin in the third layer.

In a specific aspect of the interlayer film for laminated glass according to the present invention, the content of the plasticizer in the first layer relative to 100 parts by weight of the polyvinyl acetal resin in the first layer is greater than the content of each of the plasticizer in the second layer relative to 100 parts by weight of the polyvinyl acetal resin in the second layer and the plasticizer in the third layer relative to 100 parts by weight of the polyvinyl acetal resin in the third layer.

In a specific aspect of the interlayer film for laminated glass according to the present invention, each of the polyvinyl acetal resin in the first layer, the polyvinyl acetal resin in the second layer and the polyvinyl acetal resin in the third layer is a polyvinyl butyral resin.

In a specific aspect of the interlayer film for laminated glass according to the present invention, each of the plasticizer in the first layer, the plasticizer in the second layer and the plasticizer in the third layer includes triethylene glycol di-2-ethylhexanoate.

The ratio of the thickness of the first layer to the total thickness of the first layer, the second layer and the third layer is preferably 0.2 or more and more preferably 0.24 or more.

According to a broad aspect of the present invention, there is provided laminated glass including a first laminated glass member, a second laminated glass member and an interlayer film for laminated glass described above, the interlayer film for laminated glass being arranged between the first laminated glass member and the second laminated glass member.

Effect of the Invention

Since the interlayer film for laminated glass according to the present invention includes a thermoplastic resin and a plasticizer, and when the interlayer film is sandwiched between two sheets of clear glass in accordance with JIS R3202 to obtain a sheet of laminated glass, the flexural modulus at 23° C. of the resulting sheet of laminated glass is 5000 MPa or more and 10000 MPa or less, the HIC can be effectively lowered.

Moreover, since the interlayer film for laminated glass according to the present invention includes a first layer containing a thermoplastic resin and a plasticizer, a second layer containing a thermoplastic resin and a plasticizer and a third layer containing a thermoplastic resin and a plasticizer, the second layer is layered on one surface side of the first layer, the third layer is layered on a surface side opposite to the one surface side of the first layer, the glass transition temperature of the first layer is lower than the glass transition temperature of each of the second layer and the third layer, the thickness of the first layer is thinner than the thickness of each of the second layer and the third layer, and the thickness of the first layer is 180 µm or more or the ratio of the thickness of the first layer to the total thickness of the first layer, the second layer and the third layer is greater than 0.15, the HIC can be effectively lowered.

BRIEF DESCRIPTION OF DRAWINGS

FIG. 1 is a sectional view schematically showing an interlayer film for laminated glass in accordance with the first embodiment of the present invention.

FIG. 2 is a sectional view schematically showing an interlayer film for laminated glass in accordance with the second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a figure for illustrating an HIC measuring apparatus.

FIG. 6 is a figure for illustrating an HIC measuring apparatus.

MODE(S) FOR CARRYING OUT THE INVENTION

Hereinafter, the details of the present invention will be described.

The interlayer film for laminated glass (in the present specification, sometimes abbreviated as "the interlayer film") according to the present invention preferably includes a thermoplastic resin and a plasticizer, and when the interlayer film is sandwiched between two sheets of clear glass in accordance with JIS R3202 to obtain a sheet of laminated glass, the flexural modulus at 23° C. of the resulting sheet of laminated glass is 5000 MPa or more and 10000 MPa or less.

The interlayer film according to the present in invention is preferably provided with a first layer containing a thermoplastic resin and a plasticizer, a second layer containing a thermoplastic resin and a plasticizer and a third layer containing a thermoplastic resin and a plasticizer, the second layer is layered on one surface side of the first layer, the third layer is layered on a surface side opposite to the one surface side of the first layer, the glass transition temperature of the first layer is lower than the glass transition temperature of each of the second layer and the third layer, the thickness of the first layer is thinner than the thickness of each of the second layer and the third layer, and the thickness of the first layer is 180 µm or more or the ratio of the thickness of the first layer to the total thickness of the first layer, the second layer and the third layer is greater than 0.15.

In the present invention, since the interlayer film is provided with the above-described configuration, the head injury criteria (HIC) can be effectively lowered. In the present invention, even if an occupant or a pedestrian collides with the laminated glass, the occupant or the pedestrian is hardly damaged.

From the viewpoint of further lowering the HIC, the flexural modulus of the sheet of laminated glass is preferably 5500 MPa or more, more preferably 7500 MPa or more, preferably 9000 MPa or less, more preferably 8500 MPa or less and further preferably 8000 MPa or less.

Hereinafter, the present invention will be elucidated by describing specific embodiments and examples of the present invention with reference to the drawings.

FIG. 1 is a sectional view schematically showing an interlayer film for laminated glass in accordance with the first embodiment of the present invention.

The interlayer film 1 shown in FIG. 1 is a multi-layered interlayer film having a two or more-layer structure. The interlayer film 1 is used for obtaining laminated glass. The interlayer film 1 is an interlayer film for laminated glass. The interlayer film 1 is provided with a first layer 2, a second layer 3 layered on a first surface 2a side of the first layer 2, and a third layer 4 layered on a second surface 2b side opposite to the first surface 2a of the first layer 2. The first layer 2 is an intermediate layer. For example, the second layer 3 and the third layer 4 are protective layers and are surface layers in the present embodiment. The first layer 2 is arranged between the second layer 3 and the third layer 4 to be sandwiched therebetween. Accordingly, the interlayer film 1 has a multilayer structure in which the second layer 3, the first layer 2 and the third layer 4 are layered in this order.

It is preferred that the surface 3a at a side opposite to the first layer 2 side of the second layer 3 be a surface on which a laminated glass member is layered. It is preferred that the surface 4a at a side opposite to the first layer 2 side of the third layer 4 be a surface on which a laminated glass member is layered.

The first layer 2 contains a thermoplastic resin and a plasticizer. The second layer 3 contains a thermoplastic resin and a plasticizer. The third layer 4 contains a thermoplastic resin and a plasticizer.

In the case of the multi-layered interlayer film, the second layer needs only to be arranged on the first surface side of the first layer. It is preferred that the third layer be arranged on the second surface side of the first layer. When the third layer is arranged on the second surface side of the first layer, the flexibility of the interlayer film is enhanced and the handling of the interlayer film is facilitated. Furthermore, at the surfaces of both sides of the interlayer film, the adhesivity to a laminated glass member and the like can be adjusted.

FIG. 2 is a sectional view schematically showing an interlayer film for laminated glass in accordance with the second embodiment of the present invention.

The interlayer film 31 shown in FIG. 2 is a single-layered interlayer film having a one-layer structure. The interlayer film 31 is a first layer. The interlayer film 31 is used for obtaining laminated glass. The interlayer film 31 is an interlayer film for laminated glass. The interlayer film 31 includes a thermoplastic resin and a plasticizer.

Hereinafter, the details of the first layer (including a single-layered interlayer film), the second layer and the third layer which constitute the interlayer film according to the present invention, and the details of each ingredient contained in the first layer, the second layer and the third layer will be described.

(Thermoplastic Resin)

The interlayer film includes a thermoplastic resin. It is preferred that the first layer contain a thermoplastic resin (hereinafter, sometimes described as a thermoplastic resin (1)). It is preferred that the second layer contain a thermoplastic resin (hereinafter, sometimes described as a thermoplastic resin (2)). It is preferred that the third layer contain a thermoplastic resin (hereinafter, sometimes described as a thermoplastic resin (3)). The thermoplastic resin is not particularly limited. It is possible to use a conventionally known thermoplastic resin as the thermoplastic resin. One kind of the thermoplastic resin may be used alone, and two or more kinds thereof may be combinedly used.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin in the interlayer film be a polyvinyl acetal resin. By using a polyvinyl acetal resin and a plasticizer together, the adhesive force of the interlayer film for laminated glass according to the present invention to a laminated glass member or another interlayer film is further heightened. It is preferred that the thermoplastic resin (1) be a polyvinyl acetal resin (hereinafter, sometimes described as a polyvinyl acetal resin (1)). It is preferred that the thermoplastic resin (2) be a polyvinyl acetal resin (hereinafter, sometimes described as a polyvinyl acetal resin (2)). It is preferred that the thermoplastic resin (3) be a polyvinyl acetal resin (hereinafter, sometimes described as a polyvinyl acetal resin (3)). The polyvinyl acetal resin (2) and the polyvinyl acetal resin (3) may be the same as or different from each other. One kind of each of the polyvinyl acetal resin (1), the polyvinyl acetal resin (2) and the polyvinyl acetal resin (3) may be used alone, and two or more kinds thereof may be combinedly used.

For example, the polyvinyl acetal resin can be produced by acetalizing polyvinyl alcohol with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol is preferably 200 or more, more preferably 500 or more, further preferably 1000 or more, especially preferably 1300 or more, most preferably 1500 or more, preferably 3000 or less, more preferably 2700 or less and further preferably 2400 or less. When the average polymerization degree is not less than the above lower limit, the penetration resistance of laminated glass is further enhanced. When the average polymerization degree is not more than the above upper limit, formation of an interlayer film is facilitated.

From the viewpoint of further enhancing the penetration resistance of laminated glass, it is especially preferred that the average polymerization degree of the polyvinyl alcohol be 1500 or more and 3000 or less.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is preferred that the number of carbon atoms of the acetal group be 3 or 4. When the number of carbon atoms of the acetal group in the polyvinyl acetal resin is 3 or more, the glass transition temperature of the interlayer film is sufficiently lowered. It is preferred that the polyvinyl acetal resin be a polyvinyl butyral resin.

The aldehyde is not particularly limited. In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

The content of the hydroxyl group (the amount of hydroxyl groups) of the polyvinyl acetal resin (1) is preferably 15% by mole or more, more preferably 17% by mole or more, further preferably 19% by mole or more, preferably 28% by mole or less, more preferably 27% by mole or less and further preferably 26% by mole or less. When the content of the hydroxyl group is not less than the above lower limit and not more than the above lower limit, damage to a pedestrian or an occupant can be further lowered.

The content of the hydroxyl group of each of the polyvinyl acetal resin (2) and the polyvinyl acetal resin (3) is preferably 28% by mole or more, more preferably 28.5% by mole or more, further preferably 29% by mole or more, especially preferably 29.5% by mole or more, preferably 32% by mole or less, more preferably 31% by mole or less and further preferably 30.5% by mole or less. When the content of the hydroxyl group is not less than the above lower limit, the mechanical strength of the interlayer film is further heightened. Moreover, when the content of the hydroxyl group is not more than the above upper limit, the flexibility of the interlayer film is enhanced and the handling of the interlayer film is facilitated.

From the viewpoints of further effectively lowering the HIC and effectively enhancing the penetration resistance of laminated glass, it is preferred that the content of the hydroxyl group of the polyvinyl acetal resin (1) be lower than the content of the hydroxyl group of the polyvinyl acetal resin (2). From the viewpoints of further effectively lowering the HIC and effectively enhancing the penetration resistance of laminated glass, it is preferred that the content of the hydroxyl group of the polyvinyl acetal resin (1) be lower than the content of the hydroxyl group of the polyvinyl acetal resin (3).

From the viewpoints of further effectively lowering the HIC and effectively enhancing the penetration resistance of laminated glass, each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 0.5% by mole or more, more preferably 1% by mole or more, further preferably 1.5% by mole or more, especially preferably 2% by mole or more and most preferably 3.1% by mole or more. Each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 8.5% by mole or less, more preferably 7% by mole or less, further preferably 6% by mole or less, especially preferably 5% by mole or less and most preferably 4.8% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.3% by mole or more, more preferably 0.5% by mole or more, further preferably 0.7% by mole or more, especially preferably 1.1% by mole or more, preferably 8% by mole or less, more preferably 5% by mole or less, further preferably 2% by mole or less and especially preferably 1.8% by mole or less. When the acetylation degree is not less than the above lower limit, the compatibility between the polyvinyl acetal resin and a plasticizer is heightened. When the acetylation degree is not more than the above upper limit, the mechanical strength of the interlayer film is further heightened.

The acetylation degree of each of the polyvinyl acetal resin (2) and the polyvinyl acetal resin (3) is preferably 0.3% by mole or more, more preferably 0.5% by mole or more, further preferably 0.8% by mole or more, preferably 2% by mole or less and more preferably 1.8% by mole or less. When the acetylation degree is not less than the above lower limit, the compatibility between the polyvinyl acetal resin and a plasticizer is heightened. When the acetylation degree is not more than the above upper limit, the mechanical strength of the interlayer film is further heightened. It is preferred that the acetylation degree of the polyvinyl acetal resin (1) differ from the acetylation degree of each of the polyvinyl acetal resin (2) and the polyvinyl acetal resin (3), it is more preferred that the acetylation degree of the polyvinyl acetal resin (1) differ from the acetylation degree of each of the polyvinyl acetal resin (2) and the polyvinyl acetal resin (3) by 0.1% by mole or more, and it is further preferred that the acetylation degree of the polyvinyl acetal resin (1) differ from the acetylation degree of each of the polyvinyl acetal resin (2) and the polyvinyl acetal resin (3) by 0.2% by mole or more.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 61.5% by mole or more, more preferably 61.7% by mole or more, further preferably 62% by mole or more, preferably 69% by mole or less, more preferably 68.2% by mole or less, further preferably 68% by mole or less, especially preferably 67% by mole or less and most preferably 64.9% by mole or less. When the acetalization degree is not less than the above lower limit, the compatibility between the polyvinyl acetal resin and a plasticizer is heightened. When the acetalization degree is not more than the above upper limit, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 65% by mole or more, more preferably 67% by mole or more, further preferably 67.2% by mole or more, especially preferably 68.1% by mole or more, preferably 71.7% by mole or less, more preferably 71.5% by mole or less and further preferably 70% by mole or less. When the acetalization degree is not less than the above lower limit, the compatibility between the polyvinyl acetal resin and a plasticizer is heightened. When the acetalization degree is not more than the above upper limit, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

The interlayer film includes a plasticizer. It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By using a polyvinyl acetal resin and a plasticizer together, the adhesive force of a layer containing the polyvinyl acetal resin and the plasticizer to a laminated glass member or another layer is moderately heightened. The plasticizer is not particularly limited. The plasticizer (1), the plasticizer (2) and the plasticizer (3) may be the same as or different from one another. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapryate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate and the like.

It is preferred that the plasticizer be a diester plasticizer represented by the following formula (1).

[Chemical 1]

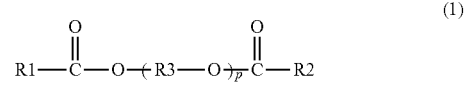

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

The content of the plasticizer (1) (hereinafter, sometimes described as the content (1)) relative to 100 parts by weight of the thermoplastic resin (1) (the polyvinyl acetal resin (1)) is preferably 50 parts by weight or more, more preferably 55 parts by weight or more, further preferably 60 parts by weight or more, preferably 90 parts by weight or less, more preferably 80 parts by weight or less and further preferably 75 parts by weight or less. When the content (1) is not less than the above lower limit, the flexibility of the interlayer film is enhanced and the handling of the interlayer film is facilitated. When the content (1) is not more than the above upper limit, mechanical strength of the interlayer film is further heightened and the penetration resistance of laminated glass is further enhanced. In particular, when the content (1) is 35 parts by weight or less, the penetration resistance of laminated glass is effectively enhanced.

Each of the content of the plasticizer (2) (hereinafter, sometimes described as the content (2)) relative to 100 parts by weight of the thermoplastic resin (2) (the polyvinyl acetal resin (2)) and the content of the plasticizer (3) (hereinafter, sometimes described as the content (3)) relative to 100 parts by weight of the thermoplastic resin (3) (the polyvinyl acetal resin (3)) is preferably 35 parts by weight or more, more preferably 37 parts by weight or more, further preferably 38 parts by weight or more, preferably 50 parts by weight or less, more preferably 45 parts by weight or less, further preferably 42 parts by weight or less, especially preferably 41 parts by weight or less and most preferably 39.9 parts by weight or less. When each of the content (2) and the content (3) is not less than the above lower limit, the flexibility of the interlayer film is enhanced and the handling of the interlayer film is facilitated. When each of the content (2) and the content (3) is not more than the above upper limit, the penetration resistance of laminated glass is further enhanced.

From the viewpoints of further effectively lowering the HIC and effectively enhancing the penetration resistance of laminated glass, for the purpose of enhancing the penetration resistance of laminated glass, it is preferred that the content (1) be greater than the content (2). From the viewpoints of further effectively lowering the HIC and effectively enhancing the penetration resistance of laminated glass, it is preferred that the content (1) be greater than the content (3).

From the viewpoints of further effectively lowering the HIC and effectively enhancing the penetration resistance of laminated glass, each of the absolute value of the difference between the content (1) and the content (2) and the absolute value of the difference between the content (1) and the content (3) is preferably 2 parts by weight or more, more preferably 5 parts by weight or more, further preferably 8 parts by weight or more, especially preferably 8.1 parts by weight or more and most preferably 9 parts by weight or more. Each of the absolute value of the difference between the content (1) and the content (2) and the absolute value of the difference between the content (1) and the content (3) is preferably 22 parts by weight or less, more preferably 20 parts by weight or less, further preferably 15 parts by weight or less and especially preferably 12 parts by weight or less.

(Other Ingredients)

Each of the first layer, the second layer and the third layer may contain additives such as an oxidation inhibitor, an ultraviolet ray screening agent, a light stabilizer, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be combinedly used.

In the case of being a single-layered interlayer film, it is preferred that the interlayer film (first layer) include an adhesive force regulating agent. It is preferred that each of the second layer and the third layer contain an adhesive force regulating agent. Although the adhesive force regulating agent is not particularly limited, for example, it is preferred that the adhesive force regulating agent be an alkali metal salt, an alkaline earth metal salt or a magnesium salt. Since the adhesive force of each of the first layer, the second layer and the third layer can be easily controlled, it is preferred that the adhesive force regulating agent be a magnesium salt or a potassium salt, and it is more preferred that the adhesive force regulating agent be a magnesium salt of a carboxylic acid or a potassium salt of a carboxylic acid. Although the magnesium salt of a carboxylic acid is not particularly limited, examples thereof include magnesium acetate, magnesium propionate, magnesium 2-ethylbutanoate, magnesium 2-ethylhexanoate, and the like. The content of the magnesium element in each of the first layer, the second layer and the third layer is preferably 200 ppm or less, more preferably 150 ppm or less, further preferably 100 ppm or less and especially preferably 80 ppm or less. The magnesium element may be contained as magnesium derived from a magnesium salt and may be contained as magnesium derived from a neutralizing agent used at the time of synthesizing polyvinyl acetal. Although the potassium salt of a carboxylic acid is not particularly limited, examples thereof include potassium formate, potassium acetate, potassium propionate, potassium 2-ethylbutanoate, potassium 2-ethylhexanoate, and the like. The content of the potassium element in each of the first layer, the second layer and the third layer is preferably 400 ppm or less, more preferably 300 ppm or less, further preferably 250 ppm or less, especially preferably 200 ppm or less and most preferably 180 ppm or less. The potassium element may be contained as potassium derived from a potassium salt and may be contained as potassium derived from a neutralizing agent used at the time of synthesizing polyvinyl acetal. In this connection, the content of the potassium element or the magnesium element can be measured by means of an ICP emission spectrometer ("ICPE-9000" available from SHIMADZU CORPORATION).

(Other Details of Interlayer Film for Laminated Glass)

From the viewpoints of further effectively lowering the HIC and effectively enhancing the penetration resistance of laminated glass, it is preferred that the glass transition temperature of the first layer be lower than the glass transition temperature of each of the second layer and the third layer. In this case, from the viewpoints of further effectively lowering the HIC and effectively enhancing the penetration resistance of laminated glass, each of the absolute value of the difference between the glass transition temperature of the first layer and the glass transition temperature of the second layer and the absolute value of the difference between the glass transition temperature of the first layer and the glass transition temperature of the third layer is preferably 25° C. or more, 30° C. or more, more preferably 32° C. or more, preferably 45° C. or less, more preferably 43° C. or less and further preferably 35° C. or less.

The thickness of the interlayer film for laminated glass according to the present invention is not particularly limited. From the viewpoint of the practical aspect and the viewpoint of sufficiently heightening the heat shielding properties, the thickness of the interlayer film is preferably 0.1 mm or more, more preferably 0.25 mm or more, preferably 3 mm or less and more preferably 1.5 mm or less. When the thickness of the interlayer film is not less than the above lower limit, the penetration resistance of laminated glass is enhanced. When the thickness of the interlayer film is not more than the above upper limit, the transparency of the interlayer film is further improved.

The thickness of the interlayer film is defined as T. From the viewpoint of further enhancing the penetration resistance of laminated glass, the thickness of the first layer is preferably 0.14 T or more, more preferably 0.16 T or more, preferably 0.72 T or less and more preferably 0.67 T or less.

From the viewpoints of enhancing the flexibility of the interlayer film and facilitating the handling of the interlayer film, the thickness of each of the second layer and the third layer is preferably 0.14 T or more, more preferably 0.16 T or more, preferably 0.43 T or less and more preferably 0.42 T or less. Moreover, when the thickness of each of the second layer and the third layer is not less than the above lower limit and not more than the above upper limit, the bleed-out of the plasticizer can be suppressed.

From the viewpoint of further enhancing the penetration resistance of laminated glass, when the interlayer film is provided with the second layer and the third layer, the total thickness of the second layer and the third layer is preferably 0.28 T or more, more preferably 0.33 T or more, preferably 0.86 T or less and more preferably 0.84 T or less. Moreover, when the total thickness of the second layer and the third layer is not less than the above lower limit and not more than the above upper limit, the bleed-out of the plasticizer can be suppressed.

From the viewpoints of further effectively lowering the HIC and effectively enhancing the penetration resistance of laminated glass, it is preferred that the thickness of the first layer be thinner than the thickness of each of the second layer and the third layer. In this case, each of the absolute value of the difference between the thickness of the first layer and the thickness of the second layer and the absolute value of the difference between the thickness of the first layer and the thickness of the third layer is preferably 25 μm or more, more preferably 50 μm or more, preferably 355 μm or less and more preferably 350 μm or less.

From the viewpoints of further lowering the HIC and effectively enhancing the penetration resistance of laminated glass, it is preferred that the thickness of the first layer be 180 μm or more or the ratio of the thickness of the first layer to the total thickness of the first layer, the second layer and the third layer be greater than 0.15. The thickness of the first layer may be 180 μm or more and the ratio of the thickness of the first layer to the total thickness of the first layer, the second layer and the third layer may be greater than 0.15. From the viewpoints of further lowering the HIC and effectively enhancing the penetration resistance of laminated glass, the ratio thereof to the total thickness of the first layer, the second layer and the third layer is preferably 0.2 or more and more preferably 0.24 or more. The ratio thereof to the total thickness of the first layer, the second layer and the third layer is preferably 0.7 or less.

Moreover, when laminated glass is used as a windshield of a vehicle such as an automobile, the head of an occupant of the vehicle sometimes collides with the windshield when the vehicle is involved in an accident or the like. When the head of an occupant collides with the windshield, the occupant penetrates through the windshield and sometimes jumps out to the outside of the vehicle. For the purpose of protecting the safety of an occupant, it is preferred that the occupant be prevented from penetrating through the windshield even if the head of the occupant collides with the windshield. By adopting the interlayer film for laminated glass according to the present invention, it is possible to prevent the occupant from penetrating through the windshield. Since it is possible to prevent the occupant from penetrating through the windshield even when the thickness of the interlayer film is thinned, it is preferred that the thickness of the first layer be thinner than the thickness of the second layer or the third layer, it is more preferred that the thickness of the first layer be thinner than the thickness of the second layer or the third layer by 10 μm or more, it is especially preferred that the thickness of the first layer be thinner than the thickness of the second layer or the third layer by 20 μm or more, and it is most preferred that the thickness of the first layer be thinner than the thickness of the second layer or the third layer by 30 μm or more.

Similarly, since it is possible to prevent the occupant from penetrating through the windshield even when the thickness of the interlayer film is thinned, the thickness of the first layer is preferably 50 μm or more, more preferably 100 μm or more, further preferably greater than 100 μm, especially preferably 150 μm or more, preferably 400 μm or less, more preferably 300 μm or less, especially preferably 250 μm or less and most preferably 200 μm or less. Furthermore, the total thickness of the second layer and the third layer is preferably 0.6 T or more, more preferably 0.65 T or more, further preferably 0.7 T or more, preferably 0.9 T or less, more preferably 0.85 T or less and further preferably 0.8 T or less.

The production method of the interlayer film according to the present invention is not particularly limited. In the case of a single-layered interlayer film, examples of the production method of the interlayer film according to the present invention include a method of extruding a resin composition with an extruder. In the case of a multi-layered interlayer film, examples of the production method of the interlayer film according to the present invention include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Because the resulting interlayer film is excellent in production efficiency, it is preferred that respective polyvinyl acetal resins contained in the second layer and the third layer be the same as each other, it is more preferred that respective polyvinyl acetal resins contained in the second layer and the third layer be the same as each other and respective plasticizers contained therein be the same as each other, and it is further preferred that the second layer and the third layer be formed from the same resin composition as each other.

(Laminated Glass)

FIG. 3 is a sectional view schematically showing an example of laminated glass prepared with the interlayer film for laminated glass shown in FIG. 1.

The laminated glass 11 shown in FIG. 3 is provided with a first laminated glass member 21, a second laminated glass member 22 and an interlayer film 1. The interlayer film 1 is arranged between the first laminated glass member and the second laminated glass member 22 to be sandwiched therebetween.

The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of a second layer 3 of the interlayer film 1. The second laminated glass member 22 is layered on an outer surface 4a of a third layer 4 of the interlayer film 1.

FIG. 4 is a sectional view schematically showing an example of laminated glass prepared with the interlayer film for laminated glass shown in FIG. 2.

The laminated glass 41 shown in FIG. 4 is provided with a first laminated glass member 21, a second laminated glass member 22 and an interlayer film 31. The interlayer film 31 is arranged between the first laminated glass member 21 and the second laminated glass member 22 to be sandwiched therebetween. The first laminated glass member 21 is layered on a first surface 31a of the interlayer film 31. The second laminated glass member 22 is layered on a second surface 31b opposite to the first surface 31a of the interlayer film 31.

As described above, the laminated glass according to the present invention is provided with a first laminated glass member, a second laminated glass member and an interlayer film arranged between the first laminated glass member and the second laminated glass member, and the interlayer film is the interlayer film for laminated glass according to the present invention.

Examples of the laminated glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that the first laminated glass member and the second laminated glass member be each a glass plate or a PET film and at least one among the first laminated glass member and the second laminated glass member be a glass plate. It is especially preferred that both of the first laminated glass member and the second laminated glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the laminated glass member is preferably 1 mm or more, preferably 5 mm or less and more preferably 3 mm or less. Moreover, when the laminated glass member is a glass plate, the thickness of the glass plate is preferably 1 mm or more, preferably 5 mm or less and more preferably 3 mm or less. When the laminated glass member is a PET film, the thickness of the PET film is preferably 0.03 mm or more and preferably 0.5 mm or less.

The production method of the laminated glass is not particularly limited. For example, an interlayer film is sandwiched between the first laminated glass member and the second laminated glass member, and the air remaining between each of the first laminated glass member and the second laminated glass member and the interlayer film is removed by passing the members through a pressing roll or by putting the members into a rubber bag to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles.

Hereinafter, the present invention will be described in more detail with reference to examples. The present invention is not limited only to these examples.

With regard to the polyvinyl butyral (PVB) resin used in the following examples and comparative examples, the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

EXAMPLE 1

Preparation of Composition X for Forming First Layer:

One hundred parts by weight of a polyvinyl acetal resin (a polyvinyl butyral (PVB) resin, the average polymerization degree of polyvinyl alcohol (PVA) of 2300, the content of the hydroxyl group of 22% by mole, the acetylation degree of 13% by mole, the butyralization degree of 65% by mole) and 60 parts by weight of triethylene glycol di-2-ethylhexanoate (3GO), which is a plasticizer, were mixed to obtain a Composition X for forming a first layer.

Preparation of Composition Y for Forming Second Layer and Third Layer:

To 39 parts by weight of triethylene glycol di-2-ethylhexanoate (3GO), which is a plasticizer, a mixture of magnesium acetate and magnesium 2-ethylbutyrate (the mixing ratio of magnesium acetate to magnesium 2-ethylbutyrate=50% by weight:50% by weight) was added, and the contents were mixed to prepare a plasticizer solution. In this connection, the amount of the mixture of magnesium acetate and magnesium 2-ethylbutyrate added was adjusted so that the concentration of the magnesium element in the second layer and the third layer becomes 50 ppm.

One hundred parts by weight of a polyvinyl acetal resin (a polyvinyl butyral (PVB) resin, the average polymerization degree of polyvinyl alcohol (PVA) of 1700, the content of the hydroxyl group of 30.6% by mole, the acetylation degree of 1.0% by mole, the butyralization degree of 68.4% by mole) and the whole amount of the plasticizer solution were mixed to obtain a Composition Y for forming a second layer and a third layer.

Preparation of Interlayer Film:

By coextruding the Composition X for forming a first layer and the Composition Y for forming a second layer and a third layer using a coextruder, an interlayer film (800 μm in thickness) having a layered structure with a stack of a second layer (300 μm in thickness)/a first layer (200 μm in thickness)/a third layer (300 μm in thickness) was prepared.

Preparation of Laminated Glass:

The interlayer film (multilayer) obtained was cut into a size of 110 cm in longitudinal length×110 cm in transversal length. Next, the interlayer film was sandwiched between two sheets of clear glass (110 cm in longitudinal length×110 cm in transversal length×2.5 mm in thickness), held in place for 30 minutes at 90° C. and pressed under vacuum with a vacuum laminator to obtain a sheet of laminated glass.

EXAMPLE 2 AND COMPARATIVE EXAMPLES 1, 2

An interlayer film and a sheet of laminated glass were prepared in the same manner as that in Example 1 except that the kind and the content of a polyvinyl acetal resin, and the kind and the content of a plasticizer were set to those listed in the following Table 1.

EXAMPLE 3

To 60 parts by weight of triethylene glycol di-2-ethylhexanoate (3GO), which is a plasticizer, a mixture of magnesium acetate and magnesium 2-ethylbutyrate (the mixing ratio of magnesium acetate to magnesium 2-ethylbutyrate=50% by weight:50% by weight) was added, and the contents were mixed to prepare a plasticizer solution. In this connection, the amount of the mixture of magnesium acetate and magnesium 2-ethylbutyrate added was adjusted so that the concentration of the magnesium element in the first layer becomes 55 ppm.

The plasticizer solution and 100 parts by weight of a polyvinyl acetal resin (a polyvinyl butyral (PVB) resin, the average polymerization degree of polyvinyl alcohol (PVA) of 2300, the content of the hydroxyl group of 22% by mole, the acetylation degree of 13% by mole, the butyralization degree of 65% by mole) were mixed to obtain a Composition X for forming a first layer. The Composition X for forming a first layer was extruded into a single-layered sheet-like shape to prepare a single-layered interlayer film with a thickness of 800 μm (800 μm in thickness). Thereafter, a sheet of laminated glass was prepared in the same manner as that in Example 1.

(Evaluation)
(0) Glass Transition Temperature

Immediately after the interlayer film obtained was stored for 12 hours under an environment of a room temperature of 23±2° C. and a humidity of 25±5%, the viscoelasticity thereof was measured by means of a viscoelasticity measuring apparatus "DVA-200" available from IT KEISOKU SEIGYO K.K. A sample of 8 mm in longitudinal length by 5 mm in transversal length was cut out therefrom, and using the shear mode, the measurement was performed under the condition in which the temperature is increased from −30° C. to 100° C. at a temperature increasing rate of 5° C./minute and under the condition of a frequency of 1 Hz and a strain of 0.08%. In the measurement results obtained, the peak temperature of the loss tangent was defined as the glass transition temperature Tg (° C.).

(1) Flexural Modulus

A sheet of laminated glass was cut into a size of 1.5 cm in longitudinal length by 10 cm in transversal length to prepare a Sample 1. The obtained Sample 1 as a test specimen was measured for the load applied and the flexure generated under the conditions of a support span of 80 mm, a measurement temperature of 22.5° C. and a descending speed of 5 mm/min using a bending tester. The flexural modulus was calculated by means of the following equation.

$$\text{Flexural modulus}(E) = \frac{L^3}{4wt^3} \frac{F}{Y} \text{ (MPa)} \quad \text{[Mathematical Expression 1]}$$

$F$: Load ($N$)

$Y$: Flexure under $F$ (mm)

$L$: Distance between fulcrums (mm)

$w$: Width of test specimen (mm)

$t$: Thickness of test specimen (mm)

(2) HIC

A sheet of laminated glass was cut into a size of 50 cm in longitudinal length by 110 cm in transversal length to prepare a Sample 2. Using an HIC measuring apparatus having a structure shown in FIG. 5 and FIG. 6, the sample was measured for the HIC. As shown in the figure, the HIC apparatus has such a structure that the outer peripheral part of a sheet of laminated glass is fixed thereby. With regard to the headform impactor, the metal-made core thereof is attached with a resin-made head skin with a hemispherical shape. A triaxial direction acceleration sensor is installed therein. The headform impactor is a dummy which is made in imitation of the human head and used in "a pedestrian protection performance test" for the certification test for automobiles such as NCAP. By means of the apparatus shown in the figure, the headform impactor was shot at a speed of 35 km/h to the center of the sheet of laminated glass and brought into collision with the sheet of laminated glass.

The HIC is calculated from the following equation. In the equation, a represents the resultant acceleration of an impact head, and t2−t1 is defined as a time interval of 15 ms. With regard to the specific testing method, the test was performed according to the contents described in "Safety standards for road trucking vehicles: Public notice of details, Appendix 99, Technical standards for pedestrian head protection" published by Ministry of Land, Infrastructure, Transport and Tourism.

$$HIC = \left(\frac{1}{t2-t1} \int_{t1}^{t2} \frac{a}{9.8} dt\right)^{2.5} (t2-t1) \quad \text{[Mathematical Expression 2]}$$

The results are shown in the following Table 1.

TABLE 1

|  |  |  |  | Ex. 1 | Ex. 2 | Ex. 3 | Comp. Ex. 1 | Comp. Ex. 2 |
|---|---|---|---|---|---|---|---|---|
| Number of layers in interlayer film |  |  |  | 3 | 3 | 1 | 3 | 3 |
| Thickness of interlayer film |  |  | μm | 800 | 790 | 800 | 770 | 760 |
| First layer | Thickness |  | μm | 200 | 190 | 800 | 110 | 100 |
|  | Polyvinyl acetal resin | Average polymerization degree of PVA |  | 2300 | 2300 | 2300 | 2300 | 2300 |
|  |  | Content of hydroxyl group | % by mole | 22.0 | 22.0 | 22.0 | 22.0 | 22.0 |
|  |  | Acetylation degree | % by mole | 13.0 | 13.0 | 13.0 | 13.0 | 13.0 |
|  |  | Acetalization degree | % by mole | 65.0 | 65.0 | 65.0 | 65.0 | 65.0 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 60 | 60 | 60 | 60 | 60 |
|  | Metal salt | Mg | ppm | — | — | 55 | — | — |
|  | Glass transition temperature |  | ° C. | 0 | 0 | — | 0 | 0 |

TABLE 1-continued

| | | | | Ex. 1 | Ex. 2 | Ex. 3 | Comp. Ex. 1 | Comp. Ex. 2 |
|---|---|---|---|---|---|---|---|---|
| Second and third layer | Each thickness | | μm | 300 | 300 | — | 330 | 330 |
| | Polyvinyl acetal resin | Average polymerization degree of PVA | | 1700 | 1700 | — | 1700 | 1700 |
| | | Content of hydroxyl group | % by mole | 30.6 | 30.6 | — | 30.6 | 30.6 |
| | | Acetylation degree | % by mole | 1.0 | 1.0 | — | 1.0 | 1.0 |
| | | Acetalization degree | % by mole | 68.4 | 68.4 | — | 68.4 | 68.4 |
| | | Content | Parts by weight | 100 | 100 | — | 100 | 100 |
| | Plasticizer | Kind | | 3GO | 3GO | — | 3GO | 3GO |
| | | Content | Parts by weight | 39 | 39 | — | 39 | 39 |
| | Metal salt | Mg | ppm | 50 | 50 | — | 50 | 50 |
| | Glass transition temperature | | ° C. | 30 | 30 | — | 30 | 30 |
| Evaluation | (1) Flexural modulus | | MPa | 8020 | 8910 | 8394 | 10627 | 10692 |
| | (2) HIC | | | 240 | 248 | 250 | 311 | 379 |

EXPLANATION OF SYMBOLS

1: Interlayer film
1a: First surface
1b: Second surface
2: First layer
2a: First surface
2b: Second surface
3: Second layer
3a: Outer surface
4: Third layer
4a: Outer surface
11: Laminated glass
21: First laminated glass member
22: Second laminated glass member
31: Interlayer film
31a: First surface
31b: Second surface
41: Laminated glass

The invention claimed is:

1. An interlayer film for laminated glass, comprising a first layer containing a thermoplastic resin and a plasticizer, a second layer containing a thermoplastic resin and a plasticizer and a third layer containing a thermoplastic resin and a plasticizer,
the second layer being layered on one surface side of the first layer,
the third layer being layered on a surface side opposite to the one surface side of the first layer,
the glass transition temperature of the first layer being lower than the glass transition temperature of each of the second layer and the third layer,
each of an absolute value of a difference between the glass transition temperature of the first layer and the glass transition temperature of the second layer and an absolute value of a difference between the glass transition temperature of the first layer and the glass transition temperature of the third layer being 25° C. or more,
the thickness of the first layer being thinner than the thickness of each of the second layer and the third layer, and
the thickness of the first layer being 1.80 μm or More or the ratio of the thickness of the first layer to the total thickness of the first layer, the second layer and the third layer being greater than 0.15.

2. The interlayer film for laminated glass according to claim 1, wherein each of the plasticizer in the first layer, the plasticizer in the second layer and the plasticizer in the third layer includes triethylene glycol di-2-ethylhexanoate.

3. A laminated glass comprising a first laminated glass member, a second laminated glass member and the interlayer film for laminated glass according to claim 1,
the interlayer film for laminated glass being arranged between the first laminated glass member and the second laminated glass member.

4. The interlayer film for laminated glass according to claim 1, wherein each of an absolute value of a difference between the glass transition temperature of the first layer and the glass transition temperature of the second layer and an absolute value of a difference between the glass transition temperature of the first layer and the glass transition temperature of the third layer is 30° C. or more.

5. The interlayer film for laminated glass according to claim 1, wherein each of an absolute value of a difference between the glass transition temperature of the first layer and the glass transition temperature of the second layer and an absolute value of a difference between the glass transition temperature of the first layer and the glass transition temperature of the third layer is 45° C. or less.

6. The interlayer film for laminated glass according to claim 1, wherein each of an absolute value of a difference between the thickness of the first layer and the thickness of the second layer and an absolute value of a difference between the thickness of the first layer and the thickness of the third layer is 350 μm or less.

7. The interlayer film for laminated glass according to claim 1, wherein the thickness of the first layer is 300 μm or less.

8. The interlayer film for laminated glass according to claim 1, wherein the glass transition temperature of the first layer is 0° C. or less.

9. The interlayer film for laminated glass according to claim 1, wherein the glass transition temperature of the first layer is 0° C. or less and the glass transition temperature of each of the second layer and the third layer is 30° C. or more.

10. The interlayer film for laminated glass according to claim 1, wherein each of the second layer and the third layer contains an adhesive force regulating agent.

11. The interlayer film for laminated glass according to claim 1, wherein at least one of the plasticizer in the first layer, the plasticizer in the second layer and the plasticizer in the third layer includes a diester plasticizer represented by the following formula (1):

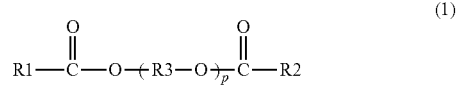

wherein R1 represents an organic group with 2 to 4 carbon atoms, R2 represents an organic group with 2 to 10 carbon atoms, R3 represents an ethylene group, an isopropylene group or an n-propylene group, and p represents an integer of 3 to 10.

12. The interlayer film for laminated glass according to claim 1, wherein at least one of the plasticizer in the first layer, the plasticizer in the second layer and the plasticizer in the third layer includes triethylene glycol di-2-ethylpropanoate.

13. The interlayer film for laminated glass according to claim 1, wherein each of the thermoplastic resin in the first layer, the thermoplastic resin in the second layer and the thermoplastic resin in the third layer is a polyvinyl acetal resin.

14. The interlayer film for laminated glass according to claim 13, wherein the content of the hydroxyl group of the polyvinyl acetal resin in the first layer is lower than the content of the hydroxyl group of each of the polyvinyl acetal resin in the second layer and the polyvinyl acetal resin in the third layer.

15. The interlayer film for laminated glass according to claim 13, wherein the content of the plasticizer in the first layer relative to 100 parts by weight of the polyvinyl acetal resin in the first layer is greater than the content of each of the plasticizer in the second layer relative to 100 parts by weight of the polyvinyl acetal resin in the second layer and the plasticizer in the third layer relative to 100 parts by weight of the polyvinyl acetal resin in the third layer.

16. The interlayer film for laminated glass according to claim 13, wherein each of the polyvinyl acetal resin in the first layer, the polyvinyl acetal resin in the second layer and the polyvinyl acetal resin in the third layer is a polyvinyl butyral resin.

17. The interlayer film for laminated glass according to claim 1, wherein the ratio of the thickness of the first layer to the total thickness of the first layer, the second layer and the third layer is 0.2 or more.

18. The interlayer film for laminated glass according to claim 17, wherein the ratio of the thickness of the first layer to the total thickness of the first layer, the second layer and the third layer is 0.24 or more.

* * * * *